US009309430B2

(12) United States Patent
Toyoda et al.

(10) Patent No.: US 9,309,430 B2
(45) Date of Patent: Apr. 12, 2016

(54) PIGMENT DISPERSION LIQUID AND SOLVENT-BASED INK COMPOSITION CONTAINING THE SAME

(71) Applicant: Seiko Epson Corporation, Tokyo (JP)

(72) Inventors: Naoyuki Toyoda, Suwa (JP); Masaru Terada, Suwa (JP); Hiroshi Takiguchi, Matsumoto (JP); Tomohiro Ogawa, Shiojiri (JP); Atsushi Denda, Chino (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 14/519,682

(22) Filed: Oct. 21, 2014

(65) Prior Publication Data

US 2015/0112003 A1 Apr. 23, 2015

(30) Foreign Application Priority Data

Oct. 23, 2013 (JP) ................................. 2013-219879
Jul. 9, 2014 (JP) ................................. 2014-141195

(51) Int. Cl.
*C09D 17/00* (2006.01)
*C09D 11/322* (2014.01)
*C09D 11/36* (2014.01)

(52) U.S. Cl.
CPC ............ *C09D 17/003* (2013.01); *C09D 11/322* (2013.01); *C09D 11/36* (2013.01); *C09D 17/002* (2013.01); *C09D 17/006* (2013.01)

(58) Field of Classification Search
CPC .... C09D 11/03; C09D 17/006; C09D 11/033; C09D 17/002; C09D 11/037; C09D 17/003
See application file for complete search history.

(56) References Cited

U.S. PATENT DOCUMENTS

| | | | | |
|---|---|---|---|---|
| 3,554,154 A * | 1/1971 | Thomas | ................... | B63B 1/34 114/222 |
| 4,753,829 A * | 6/1988 | Panush | ...................... | C09D 5/36 427/385.5 |
| 4,973,540 A * | 11/1990 | Machida | ............ | G03G 9/09716 430/108.11 |
| 5,224,987 A * | 7/1993 | Matrick | ................. | C09D 11/38 106/31.43 |
| 6,443,996 B1 * | 9/2002 | Mihelich | ............... | C04B 41/009 106/31.05 |
| 2008/0032074 A1 * | 2/2008 | Doi | .......................... | B41M 5/52 428/34.1 |
| 2008/0081864 A1 | 4/2008 | Takano | | |
| 2008/0314284 A1 | 12/2008 | Li et al. | | |
| 2011/0008613 A1 | 1/2011 | Takano et al. | | |
| 2015/0096466 A1 * | 4/2015 | Denda | ................. | C09D 11/322 106/31.65 |

FOREIGN PATENT DOCUMENTS

| | | |
|---|---|---|
| JP | 2759198 B2 | 5/1998 |
| JP | 2003-213157 A | 7/2003 |
| JP | 2006-169393 A | 6/2006 |
| JP | 2006-199920 A | 8/2006 |
| JP | 3869503 B2 | 1/2007 |
| JP | 2009-215411 A | 9/2009 |
| JP | 4358897 B1 | 11/2009 |
| JP | 2012-251070 A | 12/2012 |
| JP | 2013-122008 A | 6/2013 |
| WO | WO-95-04783 A1 | 2/1995 |

* cited by examiner

*Primary Examiner* — Alexander Kollias
(74) *Attorney, Agent, or Firm* — Harness, Dickey & Pierce, P.L.C.

(57) ABSTRACT

A pigment dispersion liquid is a pigment dispersion liquid for a solvent-based ink including a base metal pigment and an organic solvent, in which the base metal pigment is subjected to a surface treatment by a fluorine-based compound, and in which the concentration of a fluorine element is from 8 atm % to 35 atm % when an X-ray photoelectron spectroscopy (XPS) analysis of the surface of the base metal pigment is performed.

19 Claims, No Drawings

PIGMENT DISPERSION LIQUID AND SOLVENT-BASED INK COMPOSITION CONTAINING THE SAME

BACKGROUND

1. Technical Field

The present invention relates to a pigment dispersion liquid and a solvent-based ink composition containing the same.

2. Related Art

In the related art, as a technique of forming a coating film having metallic glossy on a printed matter, a foil stamping printing using a printing ink which is produced from brass, aluminum fine particles, or the like and which uses gold powder or silver powder as a pigment or a metal foil, a thermal transfer system using a metal foil, or the like has been used. However, as to those methods, there was a problem in that it was hard to form a fine pattern or apply to a curved surface part. In addition, in a foil stamping printing, there were problems in which on-demand properties were low, it was hard to cope with multiproduct production, and it was difficult to perform metallic tone printing having gradation.

On the other hand, since a powder coating material containing a metal pigment is a low pollution type coating material in which an organic solvent is not used, the demand is increasing in various industries. However, in a case of the powder coating material containing the metal pigment, if it is difficult to array the metal pigment in parallel with respect to a substrate of the coating film, the color tone of the coating film becomes dark, and thus there was a disadvantage in which it was difficult to obtain a sufficient metallic feeling. In order to overcome such a disadvantage, for example, in JP-A-2003-213157 and JP-A-2006-169393, a powder for coating material formed by coating the surface of aluminum particles with a fluorine-based (co)polymer in which a fluorine (meth)acrylic acid ester is set to an essential monomer is disclosed. In addition, in JP-A-2009-215411, a powder for coating material formed by coating the surface of aluminum particles with a fluorine-based copolymer in which a fluorine-based polymerizable monomer and a polymerizable monomer having a phosphate group are set to an essential monomer is disclosed.

In recent years, many application examples of an ink jet method in the printing have been seen, and as an application example among those, there is a metallic printing, and a development for an ink having metallic glossy has been proceeded. In the ink jet method, the metallic printing is excellent in that the metallic printing can suitably be applied for forming a fine pattern or recording to a curved surface part. For example, in JP-A-2012-251070 and JP-A-2013-122008, a composition for an ultraviolet ray curable type ink jet method including metal particles and a polymerizable compound is disclosed.

However, for example, as to aluminum particles formed by coating with a fluorine-based (co)polymer as disclosed in JP-A-2003-213157, JP-A-2006-169393, and JP-A-2009-215411, there was a problem in that the glossiness was reduced due to the process of oxidation of aluminum during a coating treatment. In addition, in a case where such aluminum pigments in which the oxidation is proceeded are dispersed in an organic solvent, there was a problem in that the aluminum pigments were easily flocculated with each other, depending on the external environment. Furthermore, once the aluminum pigments are flocculated with each other, there was a problem in that it was not easy to redisperse the aluminum pigments.

In addition, aluminum pigments and metal particles as disclosed in JP-A-2003-213157, JP-A-2006-169393, JP-A-2009-215411, JP-A-2012-251070, and JP-A-2013-122008 are not ones for the purpose of enhancement in water resistance, however, in a case where these are compounded in a solvent-based ink to record an image, there was a problem in that the weather resistance was not excellent such that an image was whitened by aluminum pigments and metal particles being reacted with moisture in the environment.

SUMMARY

An advantage of some aspects of the invention is to provide a pigment dispersion liquid in which an image excellent in glossiness and dispersibility and excellent in weather resistance in a case of being compounded in a solvent-based ink can be recorded and a solvent-based ink composition containing the same.

The invention can be realized in the following forms or application examples.

APPLICATION EXAMPLE 1

According to Application Example 1, there is provided a pigment dispersion liquid for a solvent-based ink including a base metal pigment and an organic solvent, in which the base metal pigment is subjected to a surface treatment by a fluorine-based compound, and in which the concentration of a fluorine element is from 8 atm % to 35 atm % when an X-ray photoelectron spectroscopy (XPS) analysis of the surface of the base metal pigment is performed.

According to the pigment dispersion liquid of Application Example 1, since a film having a high concentration of a fluorine element is formed on the surface of the base metal pigment, it is possible to effectively suppress a decrease in glossiness and the occurrence of flocculation between the base metal pigments, caused by the oxidation of the base metal pigment in the organic solvent.

APPLICATION EXAMPLE 2

In the pigment dispersion liquid of Application Example 1, when an XPS analysis of the surface of the base metal pigment is performed, the concentration of phosphorus, sulfur, or nitrogen or the total sum of these elements may be 1 atm % or more.

APPLICATION EXAMPLE 3

In the pigment dispersion liquid of Application Example 1 or Application Example 2, the fluorine-based compound may include fluorine and one or more kinds selected from phosphorus, sulfur, and nitrogen as a constitutional element.

APPLICATION EXAMPLE 4

In the pigment dispersion liquid of any one of Application Example 1 to Application Example 3, the fluorine-based compound may have a perfluoroalkyl group.

APPLICATION EXAMPLE 5

In the pigment dispersion liquid of Application Example 4, the number of carbon atoms of the perfluoroalkyl group may be from 1 to 6.

APPLICATION EXAMPLE 6

In the pigment dispersion liquid of any one of Application Example 1 to Application Example 5, when an XPS analysis of the surface of the base metal pigment is performed, the ratio ([F]/[O]) of the concentration of a fluorine element ([F]; atm %) to the concentration of an oxygen element ([O]; atm %) may be from 0.2 to 1.2.

APPLICATION EXAMPLE 7

In the pigment dispersion liquid of any one of Application Example 1 to Application Example 6, the base metal pigment may include at least one kind selected from aluminum, iron, copper, nickel, and chromium or an alloy with other metals.

APPLICATION EXAMPLE 8

In the pigment dispersion liquid of Application Example 7, in a case where a base metal included in the base metal pigment is aluminum or an aluminum alloy, when an XPS analysis of the surface of the base metal pigment is performed, the ratio ([F]/[Al]) of the concentration of a fluorine element ([F]; atm %) to the concentration of an aluminum element ([Al]; atm %) may be from 0.2 to 1.1.

APPLICATION EXAMPLE 9

In the pigment dispersion liquid of any one of Application Example 1 to Application Example 8, the shape of the base metal pigment may be plate-shaped.

APPLICATION EXAMPLE 10

In the pigment dispersion liquid of any one of Application Example 1 to Application Example 9, the molecular weight of the fluorine-based compound may be 1,000 or less.

APPLICATION EXAMPLE 11

According to Application Example 11, there is provided a solvent-based ink composition containing the pigment dispersion liquid of any of Application Example 1 to Application Example 10, an organic solvent, and a resin.

According to the solvent-based ink composition of Application Example 11, since the base metal pigment having a high concentration of a fluorine element on the surface is compounded, the glossiness and the weather resistance of the recorded image are remarkably enhanced. In addition, since the dispersibility of the base metal pigment in the solvent-based ink composition becomes good, the discharge stability from a liquid discharging head of a liquid droplet discharging apparatus becomes good.

APPLICATION EXAMPLE 12

In the solvent-based ink composition of Application Example 11, the fluorine-based compound which is adsorbed or bonded to the base metal pigment included in the pigment dispersion liquid and the fluorine-based compound isolated in an ink composition are included and the content of the fluorine-based compound isolated in an ink composition may be from 0.01% by mass to 3% by mass.

According to the solvent-based ink composition of Application Example 12, the base metal pigment to which the fluorine-based compound is adsorbed or bonded becomes difficult to precipitate, in addition, even if the base metal pigment is precipitated, it is possible to easily redisperse the base metal pigment, owing to an action of the fluorine-based compound isolated in the ink composition. As this reason, it is considered that as to the fluorine-based compound isolated in the ink composition, a molecular assembly such as a micelle or a vesicle in the ink composition is formed. Since the base metal pigment (to which the fluorine-based compound is adsorbed or bonded) is involved in the molecular assembly, it is presumed that the dispersibility is enhanced.

APPLICATION EXAMPLE 13

In the solvent-based ink composition of Application Example 11 or Application Example 12, a first organic solvent in which the SP value based on the Hansen method is from 7 cal/cm$^3$ to 9 cal/cm$^3$ may be included as the organic solvent.

APPLICATION EXAMPLE 14

In the solvent-based ink composition of Application Example 13, the content of the first organic solvent in an ink composition may be from 20% by mass to 95% by mass.

DESCRIPTION OF EXEMPLARY EMBODIMENTS

Hereinafter, description will be given of a suitable embodiment of the invention. The embodiment described below is intended to describe an example of the invention. In addition, the invention is not limited to the following embodiment and also includes various Modification Examples which are performed in a range without changing the gist of the invention.

Hereinafter, description will be given of a pigment dispersion liquid and a solvent-based ink composition in this order.

1. Pigment Dispersion Liquid

A pigment dispersion liquid according to the embodiment is a pigment dispersion liquid for a solvent-based ink including a base metal pigment and an organic solvent, in which the base metal pigment is subjected to a surface treatment by a fluorine-based compound, and in which the concentration of a fluorine element is from 8 atm % to 35 atm % when an X-ray photoelectron spectroscopy (XPS) analysis of the surface of the base metal pigment is performed.

"A solvent-based ink" in the invention means an ink in which a main component of a liquid medium configuring an ink is an organic solvent. "A main component is an organic solvent" means that the proportion of the content of an organic solvent in a liquid medium configuring an ink is 80% by mass or more, preferably 90% by mass or more, more preferably 95% by mass or more, and particularly preferably 100% by mass.

"A base metal" in the invention may be a metal having a greater ionization tendency than that of hydrogen and, for example, is a concept in which a metal single body such as an alkali metal, an alkaline earth metal, aluminum, iron, zinc, lead, copper, nickel, cobalt, or chromium as well as an alloy thereof are included.

The base metal pigment included in the pigment dispersion liquid according to the embodiment is one in which pigment particles configured of a material including the base metal (hereinafter, pigment particles, configured of a material including the base metal before being subjected to the surface treatment, are also referred to as "base particles") are subjected to the surface treatment by the fluorine-based compound. That is, the base metal pigment included in the pigment dispersion liquid according to the embodiment has a structure in which the surface of the pigment particles (the base particles) configured of a material including the base metal is coated with a single layer or a plurality of layers containing the fluorine-based compound.

1.1. Base Particles

Firstly, description will be given of pigment particles (base particles) configured of a material including a base metal. The base particles may be one in which a region including at least the vicinity of the surface is configured of the base metal and may also be one in which the entire region is configured of the base metal. In addition, the base particles may be one having a base part configured of a nonmetal material and a coating film configured of the base metal which coats the base part.

The base metal which configures the base particles is not particularly limited as long as the base metal meets the definition of the base metal described above, however, the base metal is preferably aluminum or an aluminum alloy from the viewpoint of ensuring the glossiness and the viewpoint of the cost. There was a problem in that the glossiness was reduced and aluminum became more easily flocculated with each other due to the process of oxidation of aluminum when aluminum or an aluminum alloy was dispersed in the organic solvent. In contrast, in the invention, since it is possible to effectively suppress the oxidation of aluminum by using aluminum or an aluminum alloy coated with a single layer or a plurality of layers containing the fluorine-based compound, it is possible to suppress a reduction in glossiness in the organic solvent and the dispersibility is remarkably enhanced.

In addition, the base particles may be one which is manufactured by any method, however, for example, it is preferable to be one obtained by forming a film formed by the base metal on one surface of a sheet-like base material using an evaporation method, afterward, peeling the film formed by the base metal from the sheet-like base material and then pulverizing. An ion plating or spattering method may be used instead of the evaporation method. According this method, since plate-shaped base particles are obtained, it is possible to effectively exhibit the glossiness or the like in which the base particles originally have.

As a sheet-like base material, for example, a plastic film such as polyethylene terephthalate can be used. In addition, a mold release agent such as silicone oil may be applied onto or a resin layer for peeling may be formed on the film forming surface of the sheet-like base material in advance in order to improve the peelability. As a resin used for the resin layer for peeling, for example, polyvinyl alcohol, polyvinyl butyral, polyethylene glycol, polyacrylic acid, polyacrylamide, a cellulose derivative such as cellulose acetate butyrate, a modified nylon resin, and the like are included. The peeling and pulverizing described above are performed by adding an external force, for example, with irradiating the film with ultrasonic waves or stirring by a homogenizer or the like in a nonaqueous-based medium.

As a nonaqueous-based medium in a case of performing the peeling and pulverizing by the method as described above, alcohols such as methanol, ethanol, propanol, or butanol; a hydrocarbon-based compound such as n-heptane, n-octane, decane, dodecane, tetradecane, toluene, xylene, cymene, durene, indene, dipentene, tetrahydronaphthalene, decahydronaphthalene, or cyclohexylbenzene; an ether-based compound such as ethylene glycol dimethyl ether, ethylene glycol diethyl ether, ethylene glycol methyl ethyl ether, diethylene glycol dimethyl ether, diethylene glycol diethyl ether, diethylene glycol methyl ethyl ether, diethylene glycol monobutyl ether acetate, diethylene glycol n-butyl ether, tripropylene glycol dimethyl ether, triethylene glycol diethyl ether, propylene glycol monomethyl ether acetate, 1,2-dimethoxyethane, bis(2-methoxyethyl)ether, or p-dioxane; a polar organic solvent such as propylene carbonate, γ-butyrolactone, N-methyl-2-pyrrolidone, N,N-dimethylformamide, N,N-dimethylacetamide, dimethyl sulfoxide, cyclohexanone, or acetonitrile can be suitably used. By using such a nonaqueous-based medium, it is possible to prevent the involuntary oxidation of the base particles or the like and reduce variations in size, shape, and characteristics between each particle.

Moreover, since the preferable average particle diameter and average thickness of the base particles are almost the same as the average particle diameter and the average thickness of the base metal pigment described below, description will be omitted here.

1.2. Fluorine-Based Compound

Next, description will be given of a fluorine-based compound used for the surface treatment of the base particles. As described above, the base metal pigment included in the pigment dispersion liquid according to the embodiment is one in which the base particles are subjected to the surface treatment by the fluorine-based compound. As such a fluorine-based compound, a compound including fluorine and one or more kinds selected from phosphorus, sulfur, and nitrogen as a constitutional element can be preferably used, and specifically, fluorine-based phosphonic acid, fluorine-based carboxylic acid, fluorine-based sulfonic acid, a salt thereof, and the like are included. If these fluorine-based compounds are used, it is possible to form a coating film by bonding a phosphoric acid group, a carboxyl group, a sulfonic acid group, or the like to the surface of the base particles. In the invention, since it is possible to effectively suppress the oxidation of the base metal pigment by using the base metal pigment coated with a single layer or a plurality of layers containing the fluorine-based compound, it is possible to ensure the glossiness in the organic solvent and remarkably enhance the dispersibility. Among those, since a phosphoric acid group is particularly excellent in bonding capability to the surface of the base particles, fluorine-based phosphonic acid and a salt thereof are more preferable.

As fluorine-based phosphonic acid and a salt thereof, one having a structure represented by the following general formula (1) is preferable.

In the formula (1), $R^1$ is each independently one kind of a group selected from among the following structural formulae and M is each independently a hydrogen atom, a hydrocarbon group, a monovalent metal ion, an ammonium ion, or —$NR^2R^3R^4$. $R^2$, $R^3$, and $R^4$ are respectively a hydrogen atom or a $C_2H_4OH$ group, however, a case where all of $R^2$, $R^3$, and $R^4$ are hydrogen atoms is excluded. n is an integer from 1 to 3, m is an integer from 1 to 12, and l is an integer from 1 to 12.

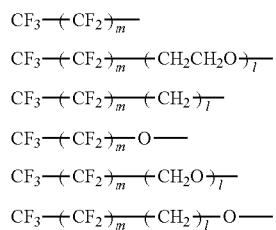

In the formula (1), m is an integer from 1 to 12, however, is preferably an integer from 1 to 8 and is more preferably an integer from 1 to 5. In addition, l is an integer from 1 to 12, however, is preferably an integer from 1 to 10 and is more preferably an integer from 1 to 6. When m and l are in the preferable range described above, the effect as described above is more prominently exhibited.

As fluorine-based phosphonic acid, a compound represented by the following general formula (2) is particularly preferable from the viewpoint of being excellent in balance between the adsorption ability to the surface of the base particles and the enhancement of the weather resistance.

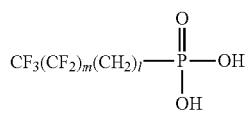

(2)

In the formula (2), m is an integer from 1 to 12, however, is preferably an integer from 1 to 8 and is more preferably an integer from 1 to 5. In addition, l is an integer from 1 to 12, however, is preferably an integer from 1 to 10 and is more preferably an integer from 1 to 6. When m and l are in the preferable range described above, the effect as described above is more prominently exhibited.

As fluorine-based carboxylic acid and a salt thereof, one having a structure represented by the following general formula (3) is preferable.

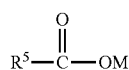

(3)

In the formula (3), $R^5$ is one kind of a group selected from among the following structural formulae and M is a hydrogen atom, a monovalent metal ion, or an ammonium ion. m is an integer from 1 to 12, however, is preferably an integer from 1 to 8 and is more preferably an integer from 1 to 5. In addition, l is an integer from 1 to 12, however, is preferably an integer from 1 to 10 and is more preferably an integer from 1 to 6.

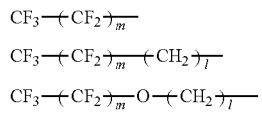

As fluorine-based sulfonic acid and a salt thereof, one having a structure represented by the following general formula (4) is preferable.

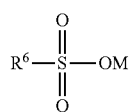

(4)

In the formula (4), $R^6$ is one kind of a group selected from among the following structural formulae and M is a hydrogen atom, a monovalent metal ion, or an ammonium ion. m is an integer from 5 to 17 and l is an integer from 1 to 12.

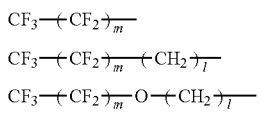

In addition, the fluorine-based compound preferably has a perfluoroalkyl group ($C_nF_{2n+1}$) in at least a part of a structure thereof and the number of carbon atoms of the perfluoroalkyl group is more preferably from 1 to 6. The base metal pigment excellent in glossiness and dispersibility is easily obtained and there is a tendency in that the weather resistance becomes better when an image is recorded, owing to the fluorine-based compound having such a structure.

Moreover, the molecular weight of the fluorine-based compound is preferably 1,000 or less. In a case where the fluorine-based compound which is adsorbed to the surface of the base particles is a fluorine-based polymer described in, for example, JP-A-2003-213157, JP-A-2006-169393, JP-A-2009-215411, or the like, there are some cases where not only the glossiness is damaged since the coating film becomes too thick but the dispersibility is significantly reduced since the interaction between the base metal pigments on which the coating film is formed becomes stronger. Therefore, the film formed on the surface of the base particles is preferably set to a monomolecular film formed by the fluorine-based compound having a molecular weight of 1,000 or less.

1.3. Method of Manufacturing Pigment Dispersion Liquid

The pigment dispersion liquid according to the embodiment can be manufactured, for example, as follows.

Firstly, a dispersion liquid in which the base particles described above are dispersed in the nonaqueous-based medium is prepared. After the dispersion liquid is diluted with the same kind or a different kind of nonaqueous-based medium as necessary, the base particles are subjected to a pulverization treatment by irradiating with ultrasonic waves until the average particle diameter of the base particles becomes 1 μm or less. The time for the pulverization treatment is not particularly limited, however, is normally from 3 hours to 24 hours. In addition, as a specific example of the nonaqueous-based medium used for dilution, the same nonaqueous-based medium as the nonaqueous-based medium in a case of performing the peeling and pulverizing exemplified above is included.

Next, the coating film of the fluorine-based compound is formed on the surface of the base particles by adding the fluorine-based compound to the dispersion liquid in which the base particles in which the pulverization treatment has been completed are dispersed in the nonaqueous-based medium and irradiating the dispersion liquid with ultrasonic waves. In doing so, the base metal pigment in which the surface of the base particles is treated by the fluorine-based compound is obtained. The additive amount of the fluorine-based compound is from 1 part by mass to 50 parts by mass, preferably from 2 parts by mass to 40 parts by mass, and more preferably from 4.5 parts by mass to 30 parts by mass, with respect to 100 parts by mass of the base particles. In addition, when the surface treatment is performed by irradiating with ultrasonic waves, the heating may be performed. As a heating temperature, it is preferable to be 40° C. or higher. It is considered that a covalent bond is formed between the surface of the base particles and the fluorine-based compound by performing a heating treatment, and thus a bonding force is strengthened.

The surface treatment of the base particles by the fluorine-based compound may be a treatment in which the surface of the base particles is directly treated, however, the treatment by the fluorine-based compound may be performed with respect to the base particles which are treated with an acid or a base in advance. Thereby, it is possible to more certainly perform the chemical modification on the surface of the base particles by the fluorine-based compound, and thus it is possible to more effectively exhibit the effect according to the invention as described above. In addition, even in a case where an oxide coating film is formed on the surface of particle to be the base particles before the surface treatment by the fluorine-based compound is performed, since the oxide coating film can be removed and the surface treatment by fluorine-based compound can be performed in a state in which the oxide coating film is removed, it is possible to make the glossiness of the base metal pigment which is manufactured excellent. As such an acid, for example, a proton acid such as hydrochloric acid, sulfuric acid, phosphoric acid, nitric acid, boric acid, acetic acid, carbonic acid, formic acid, benzoic acid, chlorous acid, hypochlorous acid, sulfurous acid, hyposulphurous acid, nitrous acid, hyponitrous acid, phosphorous acid, or hypophosphorous acid can be used. On the other hand, as a base, for example, sodium hydroxide, potassium hydroxide, calcium hydroxide, or the like can be used.

One obtained in the processes so far may be used as a pigment dispersion liquid without any change, however, after this, it is preferable to further perform a solvent substitution. It is possible to remove excess fluorine-based compounds included in the pigment dispersion liquid by performing the solvent substitution. As a specific method of the solvent substitution, the dispersion liquid containing the base metal pigment which is subjected to a fluorine treatment obtained as described above is centrifuged to remove a supernatant liquid, an appropriate amount of nonaqueous-based medium which is substituted is added thereto, and the base metal pigment is dispersed in the nonaqueous-based medium substituted by irradiating with ultrasonic waves. In doing so, the pigment dispersion liquid in which the base metal pigment is dispersed is obtained. In addition, it is also preferable that the pigment dispersion liquid thus obtained be further subjected to the heating treatment. It is presumed that the fluorine-based compound which is ion-bonded to the surface of the base particles is dehydrated to form a covalent bond by heating and the base particles can be more firmly bonded to the fluorine-based compound, and thus the effect according to the invention as described above can be more effectively exhibited. The heating temperature is preferably 50° C. or higher and more preferably 60° C. or higher. The heating treatment time is preferably from 1 day to 10 days.

In addition, as a nonaqueous-based medium used for substituting, a polar organic solvent is preferable and as a specific example thereof, the same nonaqueous-based medium as the nonaqueous-based medium in a case of performing the peeling and pulverizing exemplified above is included.

In addition, a surfactant may be further added to the nonaqueous-based medium used for substituting. As a surfactant which can be added to the nonaqueous-based medium, a fluorine-based surfactant and/or a silicone-based surfactant are preferable. The proportion of the content of the surfactant in the nonaqueous-based medium is preferably 3% by mass or less, more preferably from 0.01% by mass to 2% by mass, and particularly preferably from 0.1% by mass to 1% by mass. When the proportion of the content of the surfactant is in the range described above, there is a tendency in that the dispersibility of the base metal pigment is more enhanced. In addition, when the image is recorded, a function as a slipping agent is exhibited and there are some cases where an effect for enhancing the abrasion resistance of the image is obtained.

As a fluorine-based surfactant, for example, MEGAFACE F-430, MEGAFACE F-444, MEGAFACE F-472SF, MEGAFACE F-475, MEGAFACE F-477, MEGAFACE F-552, MEGAFACE F-553, MEGAFACE F-554, MEGAFACE F-555, MEGAFACE F-556, MEGAFACE F-558, MEGAFACE R-94, MEGAFACE RS-75, and MEGAFACE RS-72-K (hereinbefore, all trade names, manufactured by DIC Corporation); EFTOP EF-351, EFTOP EF-352, EFTOP EF-601, EFTOP EF-801, and EFTOP EF-802 (hereinbefore, all trade names, manufactured by Mitsubishi Materials Corporation); Ftergent 222F, Ftergent 251, and FTX-218 (hereinbefore, all trade names, manufactured by NEOS COMPANY LIMITED); SURFLON SC-101 and SURFLON KH-40 (hereinbefore, all trade names, manufactured by AGC SEIMI CHEMICAL CO., LTD.), and the like are included.

As a silicone-based surfactant, for example, BYK-300, BYK-306, BYK-310, BYK-320, BYK-330, BYK-344, BYK-346, BYK-UV3500, and BYK-UV3570 (hereinbefore, all trade names, manufactured by BYK Japan KK); KP-341, KP-358, KP-368, KF-96-50CS, and KF-50-100CS (hereinbefore, all trade names, manufactured by Shin-Etsu Chemical Co., Ltd.), and the like are included.

The proportion of the content of the base metal pigment in the pigment dispersion liquid according to the embodiment is not particularly limited, however, is preferably from 1% by mass to 10% by mass. When the proportion of the content of the base metal pigment in the pigment dispersion liquid is in the range described above, the dispersibility of the base metal pigment in the pigment dispersion liquid easily becomes good and it becomes possible to store the base metal pigment for a long period.

1.4. Physical Property of Base Metal Pigment 1.4.1. XPS Analysis

According to an X-ray photoelectron spectroscopy (XPS) analysis, it is possible to obtain information of the top surface (approximately several nm) of the base metal pigment. The XPS analysis is an analysis method of detecting a photoelectron emitted by irradiating a sample with an X-ray in ultrahigh vacuum. Since the photoelectron which is emitted is caused by a core electron of a target atom and the energy thereof is determined for each element, it is possible to perform the qualitative analysis by knowing an energy value.

When the XPS analysis (radiation source: Al—Kα ray, irradiation angle: 45°, detection angle: 90°) is performed, the base metal pigment included in the pigment dispersion liquid according to the embodiment is characterized in that the concentration of a fluorine element is from 8 atm % to 35 atm %. This indicates that the fluorine-based compound densely exists on the top surface (approximately several nm) of the base metal pigment. When the concentration of a fluorine element in the base metal pigment is in the range described above, since it is possible to effectively suppress the oxidation of the base metal pigment, a reduction in glossiness in the organic solvent is suppressed and the dispersibility is remarkably enhanced. In a case where the concentration of a fluorine element in the base metal pigment is less than the range described above, the effect for suppressing the oxidation of the base metal pigment easily becomes insufficient, the glossiness is easily lost in the organic solvent, and the dispersibility easily deteriorates in the organic solvent. On the other hand, the base metal pigment in which the concentration of a fluorine element in the base metal pigment exceeds the range described above has not been obtained even by the study of the inventors and technical difficulties are accompanied.

As to the base metal pigment included in the pigment dispersion liquid according to the embodiment, when the XPS analysis (radiation source: Al—Kα ray, irradiation angle: 45°, detection angle: 90°) is performed, it is preferable that the concentration of phosphorus, sulfur, or nitrogen or the total sum of these elements be 1 atm % or more. This indicates that the fluorine-based compound such as fluorine-based phosphonic acid, fluorine-based sulfonic acid, and a salt thereof is adsorbed to the top surface (approximately several nm) of the base metal pigment and densely exists. In a case where the concentration of phosphorus, sulfur, or nitrogen or the total sum of these elements is 1 atm % or more, this indicates that the film of the fluorine-based compound is formed with a good film thickness on the surface of the base metal pigment. Thereby, since it is possible to effectively suppress the oxidation of the base metal pigment, a reduction in glossiness in the organic solvent is suppressed and the dispersibility in the organic solvent is remarkably enhanced.

As to the base metal pigment included in the pigment dispersion liquid according to the embodiment, when the XPS analysis (radiation source: Al—Kα ray, irradiation angle: 45°, detection angle: 90°) is performed, the ratio ([F]/[O]) of the concentration of a fluorine element ([F]; atm %) to the concentration of an oxygen element ([O]; atm %) is preferably from 0.2 to 1.2. Since there is a tendency in that the concentration of an oxygen element depends on oxygen derived from a hydroxide of the base metal included in the base metal pigment, this also indicates that the fluorine-based compound densely exists on the top surface (approximately several nm) of the base metal pigment. When the ratio ([F]/[O]) of the base metal pigment is in the range described above, since the balance between the concentration of a fluorine element and the concentration of an oxygen element on the surface of the base metal pigment becomes good and it is possible to effectively suppress the oxidation of the base metal pigment, a reduction in glossiness in the organic solvent is suppressed and the dispersibility in the organic solvent is remarkably enhanced.

As to the base metal pigment included in the pigment dispersion liquid according to the embodiment, in a case of using aluminum or an aluminum alloy as base particles, when the XPS analysis (radiation source: Al—Kα ray, irradiation angle: 45°, detection angle: 90°) is performed, the ratio ([F]/[Al]) of the concentration of a fluorine element ([F]; atm %) to the concentration of an aluminum element ([Al]; atm %) is preferably from 0.2 to 1.1. This also indicates that the fluorine-based compound densely exists on the top surface (approximately several nm) of the base metal pigment. When the ratio ([F]/[Al]) is in the range described above, since the balance between the concentration of an aluminum element and the concentration of a fluorine element on the surface of the base metal pigment becomes good and it is possible to effectively suppress the oxidation of the base metal pigment, a reduction in glossiness in the organic solvent is suppressed and the dispersibility in the organic solvent is remarkably enhanced.

Furthermore, since an electronic state is changed depending on an environment (a chemical state) in which atoms are placed, it is possible to perform a chemical structural analysis by using the fact that a peak position is slightly shifted. Specifically, it is possible to calculate the proportion of each component by approximating a component corresponding to each chemical state using the Voigt function (the following separation expression) to divide the peak.

$$y = y_0 + A \cdot \frac{2\ln 2}{\pi^{3/2}} \frac{w_L}{w_G^2} \cdot \int_{-\infty}^{\infty} \frac{e^{-t^2}}{\left(\sqrt{\ln 2} \frac{w_L}{w_G}\right)^2 + \left(\sqrt{4\ln 2} \frac{x - x_c}{w_G} - t\right)^2} dt$$

($y_0$=offset, $x_C$=center, A=Amplitude, $w_G$=Gaussian width, $w_L$=Lorentzian width)

In a case of the base metal pigment which is subjected to the surface treatment by fluorine-based phosphonic acid (salt), the base metal pigment has the peak from 190 eV to 192 eV when approximating a component using the Voigt function to divide the peak in an X-ray photoelectron spectroscopy spectrum. By bonding fluorine-based phosphonic acid (salt) to the surface of the base particles, the chemical shift of the peak of P (phosphorus) occurs between 190 eV and 192 eV. By existing the peak from 190 eV to 192 eV, fluorine-based phosphonic acid (salt) is certainly bonded to the surface of the base particles. Thereby, since it is possible to effectively suppress the oxidation of the base metal pigment, a decrease in glossiness in the organic solvent is suppressed and the dispersibility in the organic solvent is remarkably enhanced.

In addition, In a case of the base metal pigment which is subjected to the surface treatment by the fluorine-based compound, the base metal pigment has the peaks at 291 eV and 293 eV in an X-ray photoelectron spectroscopy spectrum. Since the peak at 291 eV is a peak derived from —$CF_2$— and the peak at 293 eV is a peak derived from —$CF_3$, in a case where the peaks are recognized at 291 eV and 293 eV, it is understood that the fluorine-based compound is bonded to the surface of the base particles.

1.4.2. Shape

The shape of the base metal pigment included in the pigment dispersion liquid according to the embodiment may be any shape such as a spherical shape, a spindle shape, or a needle shape, however, a plate shape is preferable. In a case where the shape of base metal pigment is plate-shaped, since the light reflectivity becomes good, it is possible to record the image excellent in glossiness.

In the invention, "plate-shaped" means a shape in which an area when observing from a predetermined angle (when viewing in planar view) is bigger than an area when observing from an angle orthogonal to the observation direction and, in particular, the ratio ($S_1/S_0$) of an area $S_1$ [μm²] when observing from a direction in which the projected area becomes maximum (when viewing in planar view) to an area $S_0$ [μm²] when observing from a direction in which an area when observing becomes maximum among directions orthogonal to the observation direction is preferably 2 or more, more preferably 5 or more, and particularly preferably 8 or more. As this value, for example, the observation of the arbitrary 10 particles is performed and an average value of values calculated as to these particles can be employed.

1.4.3. Average Particle Diameter and Average Thickness

As to the base metal pigment included in the pigment dispersion liquid according to the embodiment, the average particle diameter is preferably from 0.25 μm to 3 μm and more preferably from 0.5 μm to 1.5 μm. In addition, as to the base metal pigment included in the pigment dispersion liquid according to the embodiment, the average thickness is preferably from 1 nm to 100 nm and more preferably from 5 nm to 50 nm. When the average particle diameter and the average thickness of the base metal pigment are in the ranges described above, in a case where the base metal pigment is applied to the solvent-based ink composition, it is possible to record the image excellent in smoothness of the coating film and excellent in glossiness. In addition, it is possible to manufacture the pigment dispersion liquid with high productivity and it is also possible to prevent the involuntary modification of the base metal pigment during manufacturing the solvent-based ink composition.

This average particle diameter is represented by the 50% average particle diameter (R50) of an equivalent circle diameter determined from an area of a projected image of the base metal pigment obtained by a particle image analyzer. "An equivalent circle diameter" means a diameter of a circle when assuming the circle having the same area as an area of a projected image of the base metal pigment obtained by using a particle image analyzer. For example, in a case where a projected image of the base metal pigment is a polygon, a diameter of a circle obtained by converting the projected image into the circle is referred to as an equivalent circle diameter of the base metal pigment.

It is possible to measure the area of the projected image and the equivalent circle diameter of the base metal pigment using a particle image analyzer. As such a particle image analyzer, for example, a flow type particle image analyzer FPIA-2100, FPIA-3000, and FPIA-3000S (hereinbefore, manufactured by Sysmex Corporation), and the like are included. Moreover, the average particle diameter of the equivalent circle diameter is a particle diameter based on the number. In addition, as a measurement method in a case of using FPIA-3000 or FPIA-3000S, a method of measuring in the HPF measurement mode using a high magnification imaging unit is included as an example.

Moreover, the average thickness means a thickness in which a side face image of the base metal pigment is photographed using a transmission electron microscope (TEM) or a scanning electron microscope (SEM), the thicknesses of base metal pigments are respectively determined, and these are averaged. Type "JEM-2000EX" manufactured by JEOL Ltd. and the like as a transmission electron microscope (TEM) and Type "S-4700" manufactured by Hitachi High-Technologies Corporation and the like as a scanning electron microscope are respectively included.

2. Solvent-Based Ink Composition

The solvent-based ink composition according to the embodiment contains the pigment dispersion liquid described above, an organic solvent, and a resin. Since the solvent-based ink composition according to the embodiment contains the above-described pigment dispersion liquid excellent in dispersibility of the base metal pigment, even in a case of being applied to a liquid droplet discharging apparatus, the clogging of a nozzle due to the base metal pigments being flocculated with each other is suppressed. Thereby, the discharge stability of ink becomes good. In addition, since it is possible to reduce the surface free energy due to an effect of fluorine in the fluorine-based compound which is bonded to the surface of the base metal pigment, the leafing of the base metal pigment easily occurs when the ink is dried, and thus it is possible to record the image excellent in glossiness. Furthermore, it is possible to record the image excellent in weather resistance owing to the water repellent effect of fluorine in the fluorine-based compound which is bonded to the surface of the base metal pigment.

The content of the base metal pigment in the solvent-based ink composition according to the embodiment is preferably from 0.1% by mass to 5.0% by mass, more preferably from 0.25% by mass to 3.0% by mass, and particularly preferably from 0.5% by mass to 2.5% by mass, with respect to the total mass of the solvent-based ink composition.

It is preferable that The solvent-based ink composition according to the embodiment include the fluorine-based compound which is adsorbed or bonded to the base metal pigment included in the pigment dispersion liquid and the fluorine-based compound isolated in the ink composition. In addition, the content of the fluorine-based compound isolated in the ink composition is preferably from 0.01% by mass to 3% by mass and more preferably from 0.05% by mass to 1.5% by mass. When the fluorine-based compound isolated in the ink composition exists with the content described above, the base metal pigment to which the fluorine-based compound is adsorbed or bonded becomes difficult to precipitate owing to an action of the isolated fluorine-based compound or even if the base metal pigment is precipitated, it is possible to easily redisperse the base metal pigment.

This mechanism is presumed as follows. It is considered that as to the fluorine-based compound isolated in the ink composition, a molecular assembly such as a micelle or a vesicle in the ink composition is formed. Since the base metal pigment (to which the fluorine-based compound is adsorbed or bonded) is involved in this molecular assembly, it is presumed that the dispersibility is enhanced.

In order to have the fluorine-based compound isolated in the ink composition with the predetermined amount, when the pigment dispersion liquid described above is prepared, the fluorine-based compound may be excessively added or when the ink composition is prepare, the fluorine-based compound may be added afterwards.

The solvent-based ink composition according to the embodiment is one which is mainly composed of an organic solvent as a liquid medium as defined above. Such an organic solvent, for example, alcohols (for example, methyl alcohol, ethyl alcohol, propyl alcohol, butyl alcohol, isopropyl alcohol, fluoroalcohol, or the like), ketones (for example, acetone, methyl ethyl ketone, cyclohexanone, or the like), esters (for example, methyl acetate, ethyl acetate, propyl acetate, butyl acetate, methyl propionate, ethyl propionate, γ-butyrolactone, δ-valerolactone, ε-caprolactone, or the like), ethers (for example, diethyl ether, dipropyl ether, tetrahydrofuran, dioxane, glycol ether, or the like), an aromatic hydrocarbon (xylene, ethylbenzene, or the like), an aliphatic hydrocarbon (hexane or the like), an alicyclic hydrocarbon (cyclohexane or the like), or the like can be used. These organic solvents can be use as one kind alone or can be used in combination of two or more kinds thereof.

Among these organic solvents, it is preferable to contain one or more kinds of alkylene glycol ethers which are liquids at normal temperature under normal pressure.

As to an alkylene glycol ether, there are an ethylene glycol-based ether and a propylene glycol-based ether in which each group of aliphatic such as methyl, ethyl, n-propyl, i-propyl, n-butyl, i-butyl, hexyl, and 2-ethylhexyl, and allyl and phenyl having a double bond is set to a base, and an alkylene glycol ether is colorless and also has less odor, and is a liquid at normal temperature, provided with characteristics of both alcohols and ethers since an alkylene glycol ether has an ether group and a hydroxyl group in a molecule. In addition, there are a monoether type in which only one hydroxyl group is substituted and a diether type in which both hydroxyl groups are substituted and these can be used in combination of a plurality of kinds thereof.

A most preferable aspect of the organic solvent contained in the solvent-based ink composition according to the embodiment is a mixture of an alkylene glycol monoether, an alkylene glycol diether, and lactone. By setting a combination of the organic solvents thus, it is possible to further more enhance an effect of the invention.

As an alkylene glycol monoether, ethylene glycol monomethyl ether, ethylene glycol monoethyl ether, ethylene glycol monoisopropyl ether, ethylene glycol monobutyl ether, ethylene glycol monohexyl ether, ethylene glycol monophenyl ether, diethylene glycol monomethyl ether, diethylene glycol monoethyl ether, diethylene glycol monobutyl ether, triethylene glycol monomethyl ether, triethylene glycol monoethyl ether, triethylene glycol monobutyl ether, tetraethylene glycol monomethyl ether, tetraethylene glycol monoethyl ether, tetraethylene glycol monobutyl ether, propylene glycol monomethyl ether, propylene glycol monoethyl ether, dipropylene glycol monomethyl ether, dipropylene glycol monoethyl ether, and the like are included.

As an alkylene glycol diether, ethylene glycol dimethyl ether, ethylene glycol diethyl ether, ethylene glycol dibutyl ether, diethylene glycol dimethyl ether, diethylene glycol diethyl ether, diethylene glycol dibutyl ether, diethylene glycol methyl ethyl ether, triethylene glycol dimethyl ether, triethylene glycol diethyl ether, triethylene glycol dibutyl ether, tetraethylene glycol dimethyl ether, tetraethylene glycol diethyl ether, tetraethylene glycol dibutyl ether, propylene glycol dimethyl ether, propylene glycol diethyl ether, dipropylene glycol dimethyl ether, dipropylene glycol diethyl ether, and the like are included.

As lactone, α-ethyl lactone, α-acetolactone, β-propiolactone, γ-butyrolactone, δ-valerolactone, ε-caprolactone, ζ-enantio lactone, η-caprylolactone, γ-valerolactone, γ-heptalactone, γ-nonalactone, β-methyl-δ-valerolactone, 2-butyl-2-ethyl propiolactone, α,α-diethyl propiolactone, and the like are included.

In addition, it is also preferable that a first organic solvent in which the SP value based on the Hansen method is from 7 cal/cm³ to 9 cal/cm³ be included. When the first organic solvent is included in the solvent-based ink composition according to the embodiment, it is possible to dissolve the fluorine-based compound in the ink composition. Thereby, it is possible to set the content of the isolated fluorine-based compound in the ink composition to a range from 0.01% by mass to 3% by mass by desorbing the fluorine-based compound which exists on the surface of the base metal pigment or adding the fluorine-based compound into the ink composition afterwards.

As such a first organic solvent, for example, xylene (8.95), ethylbenzene (8.93), butyl acetate (8.70), oleic acid (8.69), dodecyl acrylate (8.63), cyclohexane (8.40), diethyl ether (7.82), hexane (7.45), ethyl octanoate (8.3), 3-methoxybutyl acetate (8.71), 3,5,5-trimethyl-2-cyclohexen-1-one (8.87), butoxy propanol (8.9), diethylene glycol butyl methyl ether (8.1), diethylene glycol monoisobutyl ether (8.7), diethylene glycol diethyl ether (8.1), diethylene glycol dibutyl ether (7.7), diethylene glycol ethyl methyl ether (8.3), diethylene glycol isopropyl methyl ether (7.9), dipropylene glycol dimethyl ether (7.88), dipropylene glycol n-butyl ether (8.2), triethylene glycol dimethyl ether (8.7), triethylene glycol butyl methyl ether (8.0), tripropylene glycol dimethyl ether (7.4), tetraethylene glycol dimethyl ether (8.7), ethylene glycol monomethyl ether acetate (8.96), ethylene glycol monoethyl ether acetate (8.91), ethylene glycol monobutyl ether acetate (8.85), diethylene glycol monobutyl ether acetate (8.94), dipropylene glycol monomethyl ether acetate (8.6), and the like are included. Moreover, the numbers in brackets represent the SP values based on the Hansen method.

Moreover, "the SP value" in the specification is referred to as the compatibility parameter and can also be referred to as the solubility parameter. The SP value means a value calculated using the Hansen mathematical expression indicated below. The Hansen solubility parameter is one in which the solubility parameter introduced by Hildebrand is divided into three components of a dispersion term δd, a polarity term δp, and a hydrogen bond term δh to represent in three-dimensional space. In the specification, the SP value is represented by δ [(cal/cm³)$^{0.5}$] and the value calculated using the following mathematical expression is used.

$$\delta[(cal/cm^3)^{0.5}] = (\delta d^2 + \delta p^2 + \delta h^2)^{0.5}$$

Moreover, the dispersion term δd, the polarity term δp, and the hydrogen bond term δh were determined by Hansen or the successors of research thereof many times and, for example, are published in VII-698 to 711 in Polymer Handbook (the fourth edition). In addition, the Hansen solubility parameters on many solvents and resins have been examined and, for example, these solubility parameters are described in Industrial Solvents Handbook (written by Wesley L. Archer).

The content of the first organic solvent in the ink composition according to the embodiment is preferably from 20% by mass to 95% by mass and more preferably 30% by mass to 90% by mass.

As a resin used for the solvent-based ink composition according to the embodiment, for example, an acrylic resin, a styrene-acrylic resin, a rosin-modified resin, a terpene-based resin, a polyester resin, a polyamide resin, an epoxy resin, a vinyl chloride resin, a vinyl chloride-vinyl acetate copolymer, a cellulose-based resin (for example, cellulose acetate butyrate, hydroxypropyl cellulose), polyvinyl butyral, polyacryl polyol, polyvinyl alcohol, polyurethane, and the like are included.

In addition, nonaqueous-based emulsion type polymer fine particles (NAD=Non Aqueous Dispersion) can also be used as a resin. This means a dispersion liquid in which fine particles of a polyurethane resin, an acrylic resin, an acrylic polyol resin, or the like are stably dispersed in the organic solvent. As a specific product name, SANPRENE IB-501, SANPRENE IB-F370, and the like manufactured by Sanyo Chemical Industries, Ltd. are included as a polyurethane resin and N-2043-60MEX, N-2043-AF-1, and the like manufacture by Harima Chemicals, Inc. are included as an acrylic polyol resin.

These resins can be used as one kind alone or can be used in combination of two or more kinds thereof.

The content of the resin (the solid content) in the solvent-based ink composition according to the embodiment is preferably from 0.05% by mass to 10% by mass, more preferably from 0.1% by mass to 5% by mass, and particularly preferably from 0.15% by mass to 2% by mass, with respect to the total mass of the solvent-based ink composition. When the content of the resin is in the range described above, it is possible to further more enhance fixing properties to a recording medium of the base metal pigment.

At least one kind of a surfactant selected from a group consisting of a fluorine-based surfactant and a silicone-based surfactant may be further added to the solvent-based ink composition according to the embodiment. The content of the surfactant in the solvent-based ink composition according to the embodiment is preferably 3% by mass or less, more preferably from 0.01% by mass to 2% by mass, and particularly preferably from 0.1% by mass to 1% by mass, with respect to the total mass of the solvent-based ink composition. When the content of the surfactant is in the range described above, the wettability to the recording medium of the solvent-based ink composition is improved and it is possible to further more enhance fixing properties to the recording medium of the base metal pigment. In addition, a function as a slipping agent is exhibited on the recorded image and an effect for enhancing the abrasion resistance of the image is obtained.

A fluorine-based surfactant and a silicone-based surfactant like the one exemplified above, which can be added when the pigment dispersion liquid is prepared, can be used. These surfactants can be used as one kind alone or can be used in combination of two or more kinds thereof.

The solvent-based ink composition according to the embodiment can be prepared by a well-known general method. For example, the solvent-based ink composition can be obtained by firstly mixing and dissolving the organic solvent, the resin, and the additive agent to produce an ink solvent, afterwards, adding the pigment dispersion liquid containing the base metal pigment described above to the ink solvent, furthermore, mixing and stirring the ink solvent at normal temperature under normal pressure.

As to the solvent-based ink composition according to the embodiment, an application thereof is not particularly limited and, for example, the solvent-based ink composition can be applied to a writing material, a stamp, a recorder, a pen plotter, a liquid droplet discharging apparatus, or the like.

The viscosity at 20° C. of the solvent-based ink composition according to the embodiment is preferably from 2 mPa·s to 10 mPa·s and more preferably from 3 mPa·s to 5 mPa·s. When the viscosity at 20° C. of the solvent-based ink composition is in the range described above, since the solvent-based ink composition from a liquid droplet discharging nozzle is discharge with an appropriate amount and the flying curving and the scattering of the solvent-based ink composition can be further reduced, it is possible to suitably use the solvent-based ink composition for a liquid droplet discharging apparatus.

In addition, the surface tension at 20° C. of the solvent-based ink composition according to the embodiment is preferably from 20 mN/m to 50 mN/m. When the surface tension becomes less than 20 mN/m, the solvent-based ink composition is wetted and spreads, or oozed on the surface of the liquid droplet discharging head, and thus ink droplets sometimes become difficult to discharge, and when the surface tension exceeds 50 mN/m, the solvent-based ink composition is not wetted and does not spread on the surface of the recording medium, and thus it is sometimes difficult to perform successful printing.

3. Example

Hereinafter, specific description will be given of the invention based on Examples, however, the invention is not limited to Examples. "Part" and "%" in Example and Comparative Example are on the mass basis unless otherwise mentioned.

3.1. Manufacturing Pigment Dispersion Liquid for Solvent-Based Ink

3.1.1. Example 1

Firstly, a film (the arithmetical mean surface roughness Ra was 0.02 μm or less) which had the smooth surface and was made of polyethylene terephthalate was prepared.

Next, cellulose acetate butyrate (the butylation ratio from 35% to 39%) was applied onto the entire one surface of this film. Next, a film (hereinafter, also simply referred to as "an aluminum film") configured of aluminum was formed on the surface side onto which cellulose acetate butyrate was applied using an evaporation method.

Next, the film on which the aluminum film was formed was put into diethylene glycol diethyl ether to be irradiated with ultrasonic waves. Thereby, a dispersion liquid of plate-shaped particles (particles to be the base particles) made of aluminum was obtained. The content ratio of the particles made of aluminum in this dispersion liquid was 3.7% by mass.

Next, as to the dispersion liquid including the particles made of aluminum obtained as described above, 20 parts by mass of 2-(perfluorohexyl)ethylphosphonic acid was added with respect to 100 parts by mass of the particles made of aluminum and the surface treatment of the particles made of aluminum was performed while the dispersion liquid was irradiated with ultrasonic waves at solution temperature of 55° for 3 hours. After the reaction finished, the particles made of aluminum were redispersed by centrifuging and precipitating the particles made of aluminum which were subjected to the surface treatment using a centrifugal separator (6,000 rpm×30 minutes), discarding a supernatant liquid portion thereof, adding diethylene glycol diethyl ether, and further irradiating the dispersion liquid with ultrasonic waves and the dispersion liquid (the redispersion liquid) in which the content ratio of the particles made of aluminum was 3.7% by mass was obtained. This redispersion liquid was condensed using an evaporator and a paste-like dispersion liquid (dispersion medium:diethylene glycol diethyl ether) in which the content ratio of the particles made of aluminum was 10% by mass was obtained (hereinafter, the dispersion liquid thus obtained also referred to as "a fluorine-treated pigment dispersion liquid 1"). The volume average particle diameter and the average thickness of the particles made of aluminum thus obtained were respectively 0.8 μm and 20 nm.

3.1.2. Example 2

One in which the dispersion liquid of particles made of aluminum obtained in Example 1 was further warmed at 120° for 3 hours was used.

3.1.3. Examples 3 and 4 and Comparative Example 1

The pigment dispersion liquids of particles made of aluminum which were subjected to the surface treatment in the same way as Example 1, except setting the additive amount of 2-(perfluorohexyl)ethylphosphonic acid to the amounts described in Table 1, were manufactured.

3.1.4. Examples 5 to 7

The pigment dispersion liquids of particles made of aluminum which were subjected to the surface treatment in the same way as Example 1, except changing the fluorine-based compound used for the surface treatment to ones described in Table 1, were manufactured.

TABLE 1

| | Constitutional material of base particles | Surface treatment agent | Amount of surface treatment agent with respect to 100 parts by mass of base particles (part by mass) | Shape | Average particle diameter [μm] | Average thickness [nm] |
|---|---|---|---|---|---|---|
| Example 1 | Al | FHP | 20 | Plate | 0.8 | 20 |
| Example 2 | Al | FHP | 20 | Plate | 0.9 | 20 |
| Example 3 | Al | FHP | 10 | Plate | 1.0 | 19 |
| Example 4 | Al | FHP | 4.5 | Plate | 1.0 | 20 |
| Example 5 | Al | FBPA | 20 | Plate | 1.1 | 21 |
| Example 6 | Al | FOS | 20 | Plate | 1.0 | 22 |
| Example 7 | Al | FOC | 20 | Plate | 1.0 | 20 |

TABLE 1-continued

|  | Constitutional material of base particles | Surface treatment agent | Amount of surface treatment agent with respect to 100 parts by mass of base particles (part by mass) | Shape | Average particle diameter [μm] | Average thickness [nm] |
|---|---|---|---|---|---|---|
| Comparative Example 1 | Al | FHP | 3 | Plate | 0.9 | 18 |

Moreover, the abbreviations of the surface treatment agents shown in Table 1 are respectively as follows.

FHP: 2-(Perfluorohexyl)ethylphosphonic acid
FHPA: 2-(Perfluorohexyl)ethylphosphonic acid amine salt
FOS: Perfluorooctane sulfonate
FOC: Perfluorooctane carboxylate 3.2. XPS Analysis The particles made of aluminum which were subjected to the surface treatment were separated by dripping the pigment dispersion liquid obtained as described above to a membrane filter made of polytetrafluoroethylene to be filtered. One in which these particles made of aluminum which were subjected to the surface treatment were sufficiently dried was set to a sample for the XPS analysis.

Next, the sample for the XPS analysis was fixed on a sample table of an X-ray photoelectron spectroscopy analysis apparatus shown below and the abundance ratio of each element on the aluminum particle surface was measured under the following conditions. The results thereof are shown in Table 2.

X-ray photoelectron spectroscopy analysis apparatus: Type "ESCALAB 250" manufactured by THERMO ELECTRON Co., Ltd.
X-ray light source: Al—Kα ray
Energy: 1486.6 eV
X-ray irradiation angle: 45°
Detection angle: 90°
Spot diameter: 500μϕ
Step size: 0.1 eV
Dwell time (the accumulating time at each measurement point): 100 μs
Pass Energy: 20 eV As to the particles made of aluminum included in the pigment dispersion liquid obtained in Example 1, when the waveforms were separated using the Voigt function in an X-ray photoelectron spectroscopy spectrum measured using the X-ray photoelectron spectroscopy analysis apparatus, it was recognized that there was the peak from 190 eV to 192 eV. For this reason, it became clear that 2-(perfluorohexyl)ethylphosphonic acid was bonded to the surface of aluminum particles. Moreover, the same peaks in the particles made of aluminum included in the pigment dispersion liquids obtained in Examples 2 to 5 and Comparative Example 1, were recognized.

In addition, as to the particles made of aluminum included in the pigment dispersion liquid obtained in Example 1, the peaks were recognized at 291 eV and 293 eV in an X-ray photoelectron spectroscopy spectrum measured using the X-ray photoelectron spectroscopy analysis apparatus. Since the peak at 291 eV is a peak derived from —$CF_2$— and the peak at 293 eV is a peak derived from —$CF_3$, it became clear that 2-(perfluorohexyl)ethylphosphonic acid exists on the surface of the particles made of aluminum. Moreover, the same peaks in the particles made of aluminum included in the pigment dispersion liquids obtained in Examples 2 to 5 and Comparative Example 1, were recognized.

3.3. Evaluation Test 3.3.1. Evaluation of Dispersibility 10 ml of the pigment dispersion liquid obtained as described above was added to a sample bottle and the sample bottle was sealed and stored under constant temperature of 60° C. for 5 days. The dispersibility was evaluated depending on how much the pigment dispersion liquid after storing can pass through with respect to a filter of 10 μm (manufactured by MERCK MILLIPORE, MITEX MEMBRANE FILTERS (model number: LCWPO 4700)). The evaluation criteria of the dispersibility are as follows. The results of the evaluation test of the dispersibility are shown in Table 2.

"A" . . . The passing amount through the filter is 50 mL or more.

"B" . . . The passing amount through the filter is 10 mL or more or less than 50 mL.

"C" . . . The passing amount through the filter is less than 10 mL.

3.3.2. Evaluation of Glossiness

Any one kind of pigment dispersion liquids obtained as described above was dripped and applied onto a printing paper ("PM Photo Paper (Glossy) model number: KA450 PSK", manufactured by SEIKO EPSON CORPORATION) and the printing paper was dried at room temperature for 1 day. The glossiness of the particles made of aluminum was evaluated by observing the obtained sample by sight and by a scanning electron microscope (S-4700, manufactured by Hitachi High-Technologies Corporation, hereinafter, also referred to as a "SEM"). The evaluation criteria of the glossiness of the particles made of aluminum are as follows. The results of the evaluation test of the glossiness are shown in Table 2.

"A" . . . Excellent in glossiness (excellent in metallic glossiness and having specular gloss)

"B" . . . Good in glossiness (excellent in metallic glossiness, however, slightly mat tone)

"C" . . . Poor in glossiness (no metallic glossiness and exhibiting a blackish-gray color)

3.3.3. Results of Evaluation

In Table 2, the results of the evaluation tests of the dispersibility and the glossiness of the pigment dispersion liquids obtained in Examples 1 to 7 and Comparative Example 1 are shown.

TABLE 2

|  | Element concentration (atm %) | | | | | Concentration ratio | | Result of evaluation | |
|---|---|---|---|---|---|---|---|---|---|
|  | | P | | | | | | | |
|  | Al | (S or N) | C | O | F | F/O | F/Al | Dispersibility | Glossiness |
| Example 1 | 26.6 | 1.3 | 17.7 | 26.1 | 28.3 | 1.08 | 1.06 | A | A |
| Example 2 | 26.7 | 1.3 | 16.9 | 26.0 | 29.1 | 1.12 | 1.09 | A | A |

TABLE 2-continued

| | Element concentration (atm %) | | | | | Concentration ratio | | Result of evaluation | |
|---|---|---|---|---|---|---|---|---|---|
| | Al | P (S or N) | C | O | F | F/O | F/Al | Dispersibility | Glossiness |
| Example 3 | 29.5 | 0.6 | 23.2 | 29.2 | 17.6 | 0.60 | 0.60 | A | B |
| Example 4 | 33.1 | 0.4 | 23.2 | 33.8 | 9.4 | 0.28 | 0.28 | B | B |
| Example 5 | 28.2 | 1.0 | 19.7 | 24.1 | 27.0 | 1.12 | 0.96 | A | A |
| Example 6 | 24.6 | 1.5 | 18.7 | 25.3 | 29.9 | 1.18 | 1.22 | A | A |
| Example 7 | 25.4 | 1.2 | 16.4 | 25.5 | 31.5 | 1.24 | 1.24 | B | A |
| Comparative Example 1 | 27.9 | 0.2 | 36.6 | 30.4 | 4.9 | 0.16 | 0.18 | C | C |

According to results of the evaluation in Table 2, as to the pigment dispersion liquid containing the particles made of aluminum in which the concentration of a fluorine element by the XPS analysis was from 8 atm % to 35 atm %, it was found that the dispersibility became good and the glossiness was also excellent. On the other hand, as to the pigment dispersion liquid containing the particles made of aluminum in which the concentration of a fluorine element by the XPS analysis was less than 8 atm %, it was found that the dispersibility became defective and the glossiness of the recorded matter was also poor. From the above, as long as the concentration of a fluorine element on the surface of the base metal pigment by the XPS analysis was at least 8 atm % or more, it was found that the sufficient dispersibility was obtained and the glossiness became good.

3.4. Evaluation of Solvent-Based Ink Composition 3.4.1. Preparation of Solvent-Based Ink Composition Each solvent-based ink composition was prepared with the compositions shown in Table 3 and Table 4. Specifically, after the solvents and the additive agents were mixed and dissolved to produce the ink solvent, the pigment dispersion liquid was added to the ink solvent, furthermore, the ink solvent was mixed and stirred using a magnetic stirrer for 30 minutes at normal temperature under normal pressure to produce the solvent-based ink composition. Moreover, as to the inks 8 to 11 in Table 4, the fluorine-based compound was added to a fluorine-treated pigment dispersion liquid 3 afterwards so as to be the additive amount described in Table 4.

For each component described in Table 3 and Table 4, the following components were respectively used.

Fluorine-treated pigment dispersion liquid 1: the one prepared in Example 1

Fluorine-treated pigment dispersion liquid 2: the one prepared by a method of manufacturing described below Fluorine-treated pigment dispersion liquid 3: the one prepared by a method of manufacturing described below Fluorine-untreated pigment dispersion liquid: the one prepared in the same way as Example 1 except not adding 2-(perfluorohexyl)ethylphosphonic acid γ-Butyrolactone: solvent, manufactured by Kanto Chemical Co., Inc.

Diethylene glycol methyl ethyl ether: solvent, manufactured by Nippon Nyukazai Co., Ltd.

Tetraethylene glycol monobutyl ether: solvent, manufactured by Nippon Nyukazai Co., Ltd.

Tetraethylene glycol dimethyl ether: solvent, manufactured by Nippon Nyukazai Co., Ltd.

Tetraethylene glycol monobutyl ether: solvent, manufactured by Nippon Nyukazai Co., Ltd.

Diethylene glycol diethyl ether: solvent, manufactured by Nippon Nyukazai Co., Ltd.

Cellulose acetate butyrate: manufactured by Kanto Chemical Co., Inc., resin, the butylation ratio from 35% to 39%

MEGAFACE F-553: manufactured by DIC Corporation, product name, a fluorine-based surfactant BYK-UV3500: manufactured by BYK Japan KK, product name, a silicone-based surfactant Fluorine-based compound: 2-(perfluorohexyl)ethylphosphonic acid Preparation of Fluorine-Treated Pigment Dispersion Liquid 2

Firstly, a film which had the smooth surface and was made of polyethylene terephthalate (the arithmetical mean surface roughness Ra was 0.02 μm or less) was prepared. Next, cellulose acetate butyrate (the butylation ratio from 35% to 39%) was applied onto the entire one surface of this film. Next, a film (hereinafter, also simply referred to as "an aluminum film") configured of aluminum was formed on the surface side onto which cellulose acetate butyrate was applied using an evaporation method.

Next, the film on which the aluminum film was formed was put into diethylene glycol methyl ethyl ether to be irradiated with ultrasonic waves. Thereby, the dispersion liquid of plate-shaped particles made of aluminum (particles to be the base particles) was obtained. The content ratio of the particles made of aluminum in this dispersion liquid was 3.7% by mass.

Next, as to the dispersion liquid including the particles made of aluminum obtained as described above, 20 parts by mass of 2-(perfluorohexyl)ethylphosphonic acid was added with respect to 100 parts by mass of the particles made of aluminum and the surface treatment of the particles made of aluminum was performed while the dispersion liquid was irradiated with ultrasonic waves at solution temperature of 55° for 3 hours. After the reaction finished, the particles made of aluminum were redispersed by centrifuging and precipitating the particles made of aluminum which were subjected to the surface treatment using a centrifugal separator (6,000 rpm×30 minutes), discarding a supernatant liquid portion thereof, adding diethylene glycol methyl ethyl ether, and further irradiating the dispersion liquid with ultrasonic waves and the dispersion liquid (the redispersion liquid) in which the content ratio of the particles made of aluminum was 3.7% by mass was obtained. This redispersion liquid was condensed using an evaporator and a paste-like dispersion liquid (dispersion medium: diethylene glycol methyl ethyl ether) in which the content ratio of the particles made of aluminum was 10% by mass was obtained. The volume average particle diameter and the average thickness of the particles made of aluminum thus obtained were respectively 0.8 μm and 20 nm. Moreover, when the supernatant liquid portion after centrifuging and precipitating was discarded, a small amount of supernatant liquid portion was left.

Preparation of Fluorine-Treated Pigment Dispersion Liquid 3

Firstly, a film which had the smooth surface and was made of polyethylene terephthalate (the arithmetical mean surface roughness Ra was 0.02 μm or less) was prepared. Next, cellulose acetate butyrate (the butylation ratio from 35% to 39%) was applied onto the entire one surface of this film. Next, a film (hereinafter, also simply referred to as "an aluminum film") configured of aluminum was formed on the surface side onto which cellulose acetate butyrate was applied using an evaporation method.

Next, the film on which the aluminum film was formed was put into diethylene glycol diethyl ether to be irradiated with ultrasonic waves. Thereby, the dispersion liquid of plate-shaped particles made of aluminum (particles to be the base particles) was obtained. The content ratio of the particles made of aluminum in this dispersion liquid was 3.7% by mass.

Next, as to the dispersion liquid including the particles made of aluminum obtained as described above, 5 parts by mass of 2-(perfluorohexyl)ethylphosphonic acid was added with respect to 100 parts by mass of the particles made of aluminum and the surface treatment of the particles made of aluminum was performed while the dispersion liquid was irradiated with ultrasonic waves at solution temperature of 55° for 3 hours. After the reaction finished, the particles made of aluminum were redispersed by centrifuging and precipitating the particles made of aluminum which were subjected to the surface treatment using a centrifugal separator (6,000 rpm×30 minutes), discarding a supernatant liquid portion, adding diethylene glycol diethyl ether, and further irradiating the dispersion liquid with ultrasonic waves and the dispersion liquid (the redispersion liquid) in which the content ratio of the particles made of aluminum was 3.7% by mass was obtained. This redispersion liquid was condensed using an evaporator and a paste-like dispersion liquid (dispersion medium: diethylene glycol diethyl ether) in which the content ratio of the particles made of aluminum was 10% by mass was obtained. The volume average particle diameter and the average thickness of the particles made of aluminum thus obtained were respectively 0.8 μm and 20 nm.

3.4.2. Production of Evaluation Sample

An ink cartridge in which the solvent-based ink composition was filled into a dedicated cartridge for an ink jet printer PX-G930 (manufactured by SEIKO EPSON CORPORATION) was produced. Next, the obtained ink cartridge was mounted in a black row of the ink jet printer PX-G930 and the commercially available ink cartridges were mounted in nozzle rows other than this. Moreover, since the commercially available ink cartridges mounted other than the black row were used as a dummy and were not used for the evaluation in Examples, these ink cartridges did not relate to an effect of the invention.

Next, a recorded matter on which a solid pattern image was printed was obtained by discharging the above-described solvent-based ink composition mounted in the black row onto a photo paper <glossy> (manufactured by SEIKO EPSON CORPORATION) using the printer described above. Moreover, as to the printing conditions, the discharging ink weight per dot was set to 20 ng and the resolution was set to vertically 720 dpi and horizontally 720 dpi.

3.4.2.1. Evaluation of Glossiness

As to the obtained image, the degree of glossiness was measured at a flap angle of 60° using a gloss meter (manufactured by Konica Minolta, Inc., product name "MULTI Gloss 268"). The evaluation criteria of the degree of glossiness of the obtained image are as follows. The results of the evaluation test of the degree of glossiness are shown in Table 3.

"A": The degree of glossiness is 500 or more.
"B": The degree of glossiness is 400 or more and less than 500.
"C": The degree of glossiness is 300 or more and less than 400.
"D": The degree of glossiness is less than 300.

3.4.2.2. Evaluation of Weather Resistance

The obtained evaluation sample was thrown into a chamber of a xenon weather meter (manufactured by Suga Test Instruments Co., Ltd.) and a cycle test of "the light irradiation for 40 minutes", "the light irradiation and the rainfall of water for 20 minutes", "the light irradiation for 60 minutes", and "the rainfall of water for 60 minutes" in this order was performed under a test condition of 60 W/m$^2$ (300 nm to 400 nm). This cycle test was continuously performed for 2 weeks and after 2 weeks, the evaluation sample was taken out. Then, the evaluation sample which was taken out was left for 1 hour under a general environment. After the evaluation sample was left, as to solid pattern forming parts of each recorded matter which was manufactured as described above, the degree of glossiness was measured at a flap angle of 60° using a gloss meter (manufactured by Konica Minolta, Inc., product name "MULTI Gloss 268"), the lowering rate of the degree of glossiness was determined, and the evaluation was performed in accordance with the following criteria.

"A": The lowering rate of the degree of glossiness is less than 5%.
"B": The lowering rate of the degree of glossiness is 5% or more and less than 15%.
"C": The lowering rate of the degree of glossiness is 15% or more.

3.4.3. Evaluation of Continuous Printing Stability

The evaluation was performed by a test as shown below using each solvent-based ink composition which was prepared as described above. Firstly, a liquid droplet discharging apparatus arranged in a chamber (a thermal chamber) and each solvent-based ink composition described above were prepared and as to each solvent-based ink composition, the liquid droplets of 2,000,000 shots (2,000,000 droplets) were continuously discharged from each nozzle of liquid droplet discharging head in a state of optimizing a driving waveform of a piezo element, under an environment of 25° and 55% RH. Afterwards, the operation of the liquid droplet discharging apparatus was stopped and the liquid droplet discharging apparatus was left for 240 hours under an environment of 25° and 55% RH in a state in which each solvent-based ink composition was filled in a flow path of the liquid droplet discharging apparatus.

Afterwards, the liquid droplets of 4,000,000 shots (4,000,000 droplets) were continuously discharged from each environment of 25° and 55% RH. As to the liquid droplets of 4,000,000 shots discharged from a specified nozzle in the vicinity of the center part of the liquid droplet discharging head after leaving for 240 hours, the average value of the deviation amounts of the center position of each liquid droplet which was impacted from the center of a target position was determined and the evaluation was performed in accordance with the criteria of the following five grades. When this value is smaller, it can be said that the occurrence of the flying curving is effectively suppressed.

"A": The average value of the deviation amounts is less than 0.07 μm.

"B": The average value of the deviation amounts is 0.07 μm or more and less than 0.14 μm.

"C": The average value of the deviation amounts is 0.14 μm or more and less than 0.17 μm.

"D": The average value of the deviation amounts is 0.17 μm or more and less than 0.21 μm.

"E": The average value of the deviation amounts is 0.21 μm or more.

3.4.4. Evaluation of Sedimentation Properties

After 10 mL of each solvent-based ink composition prepared as described above was put into a 14 cc centrifuge tube and treated at 3,000 rpm for 10 minutes by a centrifugal separator, 0.1 cc of a supernatant thereof (a region under 10 mm from a gas-liquid interface) was collect to measure the absorbance (Abs. 500 nm), the concentration was calculated from the calibration curve prepared in advance, and the evaluation was performed in accordance with the following criteria.

"A": The concentration of the supernatant is 50% or more of the initial concentration.

"B": The concentration of the supernatant is 35% or more and less than 50% of the initial concentration.

"C": The concentration of the supernatant is less than 35% of the initial concentration.

3.4.5. Redispersibility

After 10 mL of each solvent-based ink composition prepared as described above was put into a 14 cc centrifuge tube and treated at 3,000 rpm for 10 minutes by a centrifugal separator, the solvent-based ink composition was shaken 100 times to be stirred. 0.1 cc of a supernatant thereof (a region under 10 mm from a gas-liquid interface) was collect to measure the absorbance (Abs. 500 nm), the concentration was calculated from the calibration curve prepared in advance, and the evaluation was performed in accordance with the following criteria.

"A": The concentration of the supernatant is 95% or more of the initial concentration.

"B": The concentration of the supernatant is 85% or more and less than 95% of the initial concentration.

"C": The concentration of the supernatant is less than 85% of the initial concentration.

3.4.6. Results of Evaluation

In Table 3 and Table 4, the compositions of each solvent-based ink composition and the results of the evaluation test are shown.

TABLE 3

| | Kind of solvent-based ink | Ink 1 | Ink 2 | Ink 3 | Ink 4 | Ink 5 | Ink 6 |
|---|---|---|---|---|---|---|---|
| Pigment dispersion liquid | Fluorine-treated pigment dispersion liquid 1 (solid content) | 1.5 | 1.5 | 1.5 | 1.5 | 1.5 | — |
| | Fluorine-untreated pigment dispersion liquid (solid content) | — | — | — | — | — | 1.5 |
| Organic solvent | γ-Butyrolactone | 15 | 15 | 10 | 10 | 15 | 10 |
| | Diethylene glycol methyl ethyl ether | 75 | 75 | — | — | 75.3 | — |
| | Tetraethylene glycol monobutyl ether | 8 | 8 | — | — | 8 | — |
| | Tetraethylene glycol dimethyl ether | — | — | 15 | 15 | — | 15 |
| | Tetraethylene glycol monobutyl ether | — | — | 3 | 3 | — | 3 |
| | Diethylene glycol diethyl ether | — | — | 70 | 70 | — | 70.3 |
| Resin | Cellulose acetate butyrate | 0.2 | 0.2 | 0.2 | 0.2 | 0.2 | 0.2 |
| Surfactant | MEGAFACE F-553 | 0.3 | — | 0.3 | — | — | — |
| | BYK-UV3500 | — | 0.3 | — | 0.3 | — | 0.3 |
| Result of evaluation | Glossiness | B | B | A | A | C | D |
| | Weather resistance | B | A | B | A | B | C |
| | Continuous printing stability | B | A | B | A | C | E |

TABLE 4

| | Kind of solvent-based ink | Ink 7 | Ink 8 | Ink 9 | Ink 10 | Ink 11 |
|---|---|---|---|---|---|---|
| Pigment dispersion liquid | Fluorine-treated pigment dispersion liquid 2 (solid content) | 1.5 | — | — | — | — |
| | Fluorine-treated pigment dispersion liquid 3 (solid content) | — | 1.5 | 1.5 | 1.5 | 1.5 |
| Organic solvent | γ-Butyrolactone | 15 | 15 | 15 | 15 | 15 |
| | Diethylene glycol methyl ethyl ether | 75 | 75 | 75 | 75 | 8 |
| | Tetraethylene glycol monobutyl ether | 8 | 8 | 8 | 8 | 75 |
| Resin | Cellulose acetate butyrate | 0.2 | 0.2 | 0.2 | 0.2 | 0.2 |
| Surfactant | BYK-UV3500 | 0.3 | 0.3 | 0.3 | 0.3 | 0.3 |
| Fluorine-based compound | Post addition of fluorine-based compound | No | Yes | Yes | Yes | Yes |
| | Concentration of fluorine-based compound | 0.2 | 0.05 | 0.5 | 1.5 | 1.5 |
| Results of evaluation | Sedimentation properties | A | B | A | A | A |
| | Redispersibility | A | A | A | A | B |

As shown in Table 3, according to the solvent-based ink compositions (the inks 1 to 5) produced using the pigment dispersion liquid of Example 1, it was found that the recorded matters excellent in degree of glossiness and weather resistance was obtained and the continuous printing stability became good. On the other hand, according to the solvent-based ink composition (the ink 6) produced using the fluorine-untreated pigment dispersion liquid, the recorded matter in which the degree of glossiness and weather resistance were not excellent was obtained. In addition, in a continuous discharging stability test, the deviation amount became very large, and thus it was difficult to suppress the occurrence of the flying curving. It is considered that this is because the clogging at the head portion occurred due to the particles made of aluminum being flocculated in the solvent-based ink composition and the particle diameter being increased. From the above, in a case of preparing the solvent-based ink composition having glossiness, the advantages by using the fluorine-treated pigment dispersion liquid were shown.

As shown in Table 4, as to the ink 7 in which the concentration of the fluorine-based compound was adjusted to 0.2% by mass by the isolated fluorine-based compound remained in the fluorine-treated pigment dispersion liquid 2, it was found that the base metal pigment treated by the fluorine-based compound was difficult to precipitate and the redispersibility of the precipitated base metal pigment became good. In addition, even as to the inks 8 to 11 in which the concentration of the fluorine-based compound was adjusted from 0.05% by mass to 1.5% by mass by adding the fluorine-based compound to the ink composition afterwards, it was found that the base metal pigment treated by the fluorine-based compound was difficult to precipitate and the redispersibility of the precipitated base metal pigment became good. From the above, it was indicated that sedimentation properties and the redispersibility of the base metal pigment treated by the fluorine-based compound became good due to existing the fluorine-based compound isolated in the ink composition with the predetermined amount.

The invention is not limited to the embodiment described above and various modifications are possible. For example, the invention includes substantially the same configuration as the configuration described in the embodiment (for example, the configuration having the same function, method, and result or the configuration having the same object and advantage). In addition, the invention includes a configuration in which an inessential part of the configuration described in the embodiment is replaced. In addition, the invention includes a configuration which exhibits the same working effect or a configuration which can achieves the same object as those of the configuration described in the embodiment. In addition, the invention includes a configuration imparting a well-known art to the configuration described in the embodiment.

The entire disclosure of Japanese Patent Application Nos. 2013-219879, filed Oct. 23, 2013 and 2014-141195, filed Jul. 9, 2014 are expressly incorporated by reference herein.

What is claimed is:

1. A pigment dispersion liquid for a solvent-based ink, comprising:
a base metal pigment; and an organic solvent, wherein the shape of the base metal pigment is plate-shaped, and wherein the base motel pigment is subjected to a surface treatment by a fluorine-based compound, and wherein the concentration of a fluorine element is from 8 atm % to 35 atm % when an X-ray photoelectron spectroscopy (XPS) analysis of the surface of the base metal pigment is performed.

2. The pigment dispersion liquid according to claim 1, wherein when an XPS analysis of the surface of the base metal pigment is performed, the concentration of phosphorus, sulfur, or nitrogen or the total sum of these elements is 1 atm % or more.

3. The pigment dispersion liquid according to claim 1, wherein the fluorine-based compound includes one or more constitutional element selected from the group consisting of phosphorus, sulfur, and nitrogen.

4. The pigment dispersion liquid according to claim 1, wherein the fluorine-based compound has a perfluoroalkyl group.

5. The pigment dispersion liquid according to claim 4, wherein the number of carbon atoms of the perfluoroalkyl group is from 1 to 6.

6. The pigment dispersion liquid according to claim 1, wherein when an XPS analysis of the surface of the base metal pigment is performed, the ratio concentration of the fluorine element in atm % to a concentration of oxygen element in atm % is from 0.2 to 1.2.

7. The pigment dispersion liquid according to claim 1, wherein the base metal pigment includes at least one metal selected from the group consisting of aluminum, iron, copper, nickel, chromium, and an alloy with other metals.

8. The pigment dispersion liquid according to claim 7, wherein in a case where a base metal included in the base metal pigment is aluminum or an aluminum alloy, when an XPS analysis of the surface of the base metal pigment is performed, the ratio concentration of the fluorine element in atm % to a concentration of an aluminum element in atm % is from 0.2 to 1.1.

9. The pigment dispersion liquid according to claim 1, wherein the molecular weight of the fluorine-based compound is 1,000 or less.

10. A solvent-based ink composition, comprising:
the pigment dispersion liquid according to claim 1;
an organic solvent; and
a resin.

11. A solvent-based ink composition, comprising:
the pigment dispersion liquid according to claim 2;
an organic solvent; and
a resin.

12. A solvent-based ink composition, comprising:
the pigment dispersion liquid according to claim 3;
an organic solvent; and
a resin.

13. A solvent-based ink composition, comprising:
the pigment dispersion liquid according to claim 4;
an organic solvent; and
a resin.

14. A solvent-based ink composition, comprising:
the pigment dispersion liquid according to claim 5;
an organic solvent; and
a resin.

15. A solvent-based ink composition, comprising:
the pigment dispersion liquid according to claim 6;
an organic solvent; and
a resin.

16. A solvent-based ink composition, comprising:
the pigment dispersion liquid according to claim 7;
an organic solvent; and
a resin.

17. The solvent-based ink composition according to claim 10, wherein the fluorine-based compound which is adsorbed or bonded to the base metal pigment included in the pigment dispersion liquid and the fluorine-based compound isolated in the solvent-based ink composition are included, and wherein the content of the fluorine-based compound isolated in the solvent-based ink composition is from 0.01% by mass to 3% by mass.

18. The solvent-based ink composition according to claim 10, wherein a first organic solvent in which the SP value based on the Hansen method is from 7 cal/cm$^3$ to 9 cal/cm$^3$ is included as the organic solvent.

19. The solvent-based ink composition according to claim 18, wherein the content of the first organic solvent in the solvent-based ink composition is from 20% by mass to 95% by mass.

* * * * *